United States Patent
Choi et al.

(10) Patent No.: US 10,495,323 B2
(45) Date of Patent: Dec. 3, 2019

(54) AIR CONDITIONER AND OPERATING METHOD THEREOF

(71) Applicant: LG ELECTRONICS INC., Seoul (KR)

(72) Inventors: Jieun Choi, Seoul (KR); Woojin Kim, Seoul (KR); Hojung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 299 days.

(21) Appl. No.: 15/305,606

(22) PCT Filed: Apr. 22, 2015

(86) PCT No.: PCT/KR2015/004023
§ 371 (c)(1),
(2) Date: Oct. 20, 2016

(87) PCT Pub. No.: WO2015/163691
PCT Pub. Date: Oct. 29, 2015

(65) Prior Publication Data
US 2017/0045239 A1     Feb. 16, 2017

(30) Foreign Application Priority Data
Apr. 22, 2014    (KR) .................. 10-2014-0047962

(51) Int. Cl.
*F24F 1/0007*    (2019.01)
*F24F 1/00*    (2019.01)
(Continued)

(52) U.S. Cl.
CPC .............. *F24F 1/0007* (2013.01); *B05B 5/16* (2013.01); *F24F 1/00* (2013.01); *F24F 1/0011* (2013.01);
(Continued)

(58) Field of Classification Search
CPC .......... F24F 1/00; F24F 1/0007; F24F 1/0011; F24F 3/166; F24F 11/30; F24F 11/61;
(Continued)

(56) References Cited

U.S. PATENT DOCUMENTS 5,337,963 A    8/1994   Noakes
5,927,618 A *   7/1999   Jefferies ................ B05B 5/0255
                                                               239/44
(Continued)

FOREIGN PATENT DOCUMENTS

CN           2911518 Y     6/2007
JP        2004-358361 A    12/2004
(Continued)

*Primary Examiner* — Darren W Gorman
(74) *Attorney, Agent, or Firm* — Dentons US LLP (57) ABSTRACT

Disclosed is an air conditioner including a tray and a capsule installed to the tray to discharge a functional material. The capsule includes a main body defining an inner space for accommodation of an electrode, a first cover configured to cover the top of the inner space, the first cover having a first hole for discharge of the atomized functional material, and a second cover having a protrusion for accommodation of at least a portion of the electrode. The capsule realizes uniform spraying of the functional material despite variation in temperature inside the air conditioner.

13 Claims, 7 Drawing Sheets

(51) Int. Cl.
  *B05B 5/16* (2006.01)
  *F24F 1/0011* (2019.01)
  *F24F 13/20* (2006.01)
  *F24F 11/30* (2018.01)
  *F24F 11/62* (2018.01)
  *F24F 3/16* (2006.01)
  *F24F 11/61* (2018.01)

(52) U.S. Cl.
  CPC ............. *F24F 3/166* (2013.01); *F24F 11/30* (2018.01); *F24F 11/62* (2018.01); *F24F 13/20* (2013.01); *F24F 11/61* (2018.01); *F24F 2003/1689* (2013.01)

(58) Field of Classification Search
  CPC .... F24F 11/62; F24F 13/20; F24F 2003/1689; B05B 5/16
  See application file for complete search history.

(56) References Cited

U.S. PATENT DOCUMENTS

2006/0180143 A1* 8/2006 Lind .................... A61M 15/02
                                                  128/200.14
2013/0153690 A1   6/2013 Omori et al.

FOREIGN PATENT DOCUMENTS

| JP | 2006-234245 A | 9/2006 |
| KR | 10-2007-0014774 A | 2/2007 |
| KR | 20-0465443 Y1 | 2/2013 |
| KR | 10-1385290 B1 | 4/2014 |

\* cited by examiner

AIR CONDITIONER AND OPERATING METHOD THEREOF

This application is a National Stage Application of International Application No. PCT/KR2015/004023 filed on Apr. 22, 2015, which claims the benefit of Korean Patent Application No. 10-2014-0047962 filed on Apr. 22, 2014, all of which are hereby incorporated by reference in their entirety for all purposes as if fully set forth herein.

TECHNICAL FIELD

The present invention relates to an air conditioner and an operating method thereof and, more particularly, to an air conditioner having a spray device that sprays a functional material and an operating method thereof.

BACKGROUND ART

An air conditioner is capable of implementing heat exchange between refrigerant and indoor air via compression, condensation, expansion, and evaporation of the refrigerant. The refrigerant exchanges heat with the indoor air in an indoor heat exchanger. The refrigerant is condensed via heat exchange with the indoor air during a heating operation of the air conditioner, but is evaporated via heat exchange with the indoor air during a cooling operation of the air conditioner.

The air, heated or cooled via heat exchange in the indoor heat exchanger, is returned to a room to cool or heat the room.

Meanwhile, an air conditioner that promotes human health using an anion or antibacterial filter has recently been developed. Moreover, a method using an electrostatic spray device incorporated in the air conditioner has recently been proposed to discharge particles that promote human health.

The electrostatic spray device is devised to split liquid into small droplets by electric force. Such electrostatic spraying has a characteristic to generate charged fine droplets that exhibit a monodispersed distribution in a cone-jet mode.

In one example, Korean Patent Laid Open Publication No. 10-2014-0003015 (hereinafter, referred to as the cited invention) discloses an electrostatic spray device.

In accordance with the cited invention, when the spray device is mounted to an air conditioner, for example, inside the air conditioner, variation in interior temperature occurs during operation of the air conditioner. At this time, a pneumatic pressure inside the spray device increases, causing leakage of, for example, an oil from the inside of the spray device. In addition, an electric field created in the spray device for electrostatic spraying is not stable, which makes it impossible to achieve uniform spraying.

PRIOR ART DOCUMENT

Patent Document

KR 10-2014-0003015 A (published on Jan. 9, 2014)

DISCLOSURE OF INVENTION

Technical Problem

It is one object of the present invention to provide an air conditioner having a material spray device which is capable of preventing leakage of a liquid phase functional material due to variation in temperature inside the air conditioner and of achieving uniform spraying and an operating method thereof.

Solution to Problem

In accordance with one embodiment of the present invention, the above and other objects can be accomplished by the provision of an air conditioner including a tray and a capsule installed to the tray to discharge a functional material, wherein the capsule includes a main body defining an inner space for accommodation of an electrode, a first cover configured to cover the top of the inner space, the first cover having a first hole for discharge of the atomized functional material, and a second cover having a protrusion for accommodation of at least a portion of the electrode.

The protrusion may extend downward from the second cover and accommodate an upper portion of the electrode.

The protrusion may have a second hole formed therein for passage of the electrode.

The protrusion may further have a third hole configured to allow air to be introduced to the protrusion and directed to the second hole.

The protrusion may include a hollow cylindrical portion configured to surround part of an outer periphery of the electrode, and a hollow plate portion formed at the hollow cylindrical portion, the hollow plate portion having an electrode penetration aperture for passage of the electrode.

The hollow cylindrical portion may be spaced apart from the electrode, and the hollow cylindrical portion and the electrode may define an air passage therebetween.

The electrode penetration aperture may have a smaller cross sectional area than a cross sectional area of the second hole.

The hollow plate portion may come into contact with the electrode.

The protrusion having the electrode penetration aperture may further have a third hole configured to allow air to be introduced to the protrusion and directed to the second hole.

The capsule may further include a ground ring provided between the first cover and the second cover to generate a potential difference with the electrode.

The tray may include a ground configured to come into contact with the ground ring.

The ground ring may include a ring body having an annular shape, the ring body being coupled to a central portion of the second cover, a support bar extending from at least one side of the ring body, and a ground coupling portion forming an end of the support bar to come into contact with the ground.

The tray may include a seating recess for installation of the capsule, and the seating recess may include an installation plane provided with a power applying part and an inner circumferential surface extending from an upper surface of the tray to the installation plane.

The tray may further include a ground located at the inner circumferential surface thereof.

The capsule may include a power contact piece installed to the bottom of the main body, and a ground ring installed to at least one of the first cover and the second cover, the ground ring generating a potential difference with the electrode.

The tray may include a seating recess configured to allow at least a portion of the capsule to be inserted and accommodated therein, a ground installed to the seating recess so as to come into contact with the ground ring when the capsule is mounted in the seating recess, and a power applying part installed at the bottom of the seating recess so as to come into contact with the power contact piece when the capsule is mounted in the seating recess.

In accordance with another embodiment of the present invention, there is provided an operating method of an air conditioner, the operating method including applying a voltage to a capsule installed to a tray of the air conditioner for a first set time when the air conditioner is turned on and an aroma mode is selected, and applying no voltage to the capsule for a second set time after the first time has passed, wherein the applying the voltage and the not applying the voltage are performed at a predetermined number of times.

The second set time may be longer than the first set time.

Advantageous Effects of Invention

The present invention has an advantage of uniformly spraying a functional material even if variation in temperature inside an air conditioner occurs.

In addition, when a ground ring is horizontally installed in ground ring coupling recesses, a stable electric field may be created, which realizes uniform spraying.

In addition, through the use of a capsule mounting structure (i.e. a tray) formed with a ground and a capsule seating recess, contact performance between a capsule and the mounting structure may be enhanced.

In addition, the air conditioner is capable of maintaining pleasant indoor air by discharging a functional material.

BRIEF DESCRIPTION OF DRAWINGS

The above and other objects, features and other advantages of the present invention will be more clearly understood from the following detailed description taken in conjunction with the accompanying drawings, in which.

BEST MODE FOR CARRYING OUT THE INVENTION

Hereinafter, some embodiments of the present invention will be described in detail with reference to the accompanying drawings. It should be noted that the same or similar elements are denoted by the same reference numerals even though they are depicted in different drawings. In addition, in the following description of the present invention, a detailed description of known functions and configurations incorporated herein will be omitted when it may make the subject matter of the present invention rather unclear.

In addition, it will be understood that the terms first, second, A, B, (a), (b), etc., may be used herein to describe various elements according to the embodiments of the present invention. These terms are only used to distinguish one element from another element and, thus, are not intended to limit the essence, order, or sequence of the element. It will be understood that when any element is referred to as being "connected to," "coupled to", or "joined to" another element, it may be directly on, connected to or coupled to the other element or intervening elements may be present.

Figure 1:
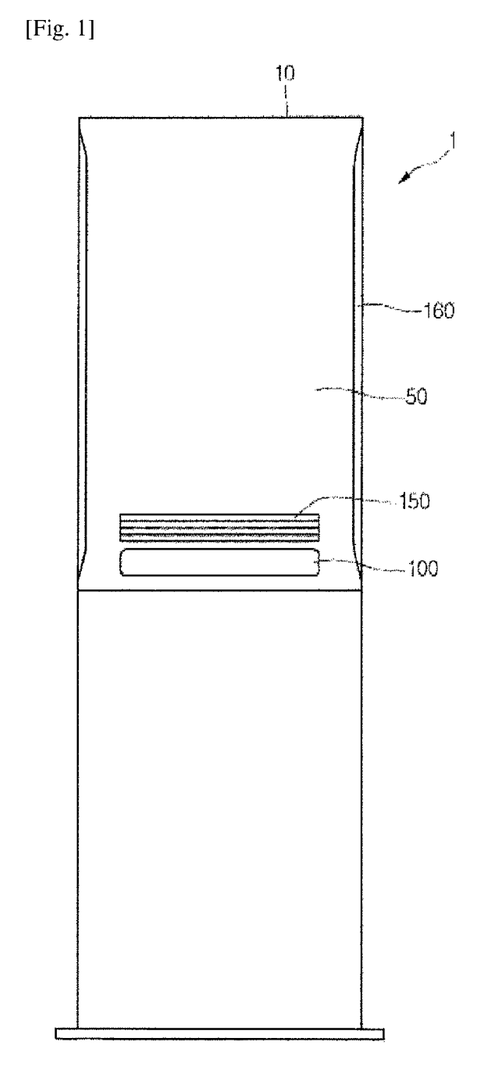
FIG. 1 is a sectional view illustrating a main body of an air conditioner according to an embodiment of the present invention.

FIG. 1 is a sectional view illustrating a main body of an air conditioner according to an embodiment of the present invention.

The main body may be applied to any one of a stand type air conditioner, a wall mounted air conditioner, a ceiling air conditioner, and the like and, for convenience, will be described below as being applied to the stand type air conditioner by way of example.

Referring to FIG. 1, the air conditioner 1 according to one embodiment of the present invention may include a case 10 defining an inner space. The case 10 may include a front panel 50 defining a front appearance of the air conditioner 1.

The air conditioner 1 may include a retractable tray 100 and a front vent grill 150 through which conditioned air is discharged from the inside of the air conditioner 1. The tray 100 may be located at approximately a central portion of the air conditioner 1 so as to be retractable.

In addition, the case 10 may be provided at both sides thereof with side vent grills 160 through which conditioned air is discharged from the inside of the air conditioner 1.

Although not illustrated in FIG. 1, the air conditioner 1 may incorporate a heat exchanger that exchanges heat with suctioned air passing therethrough to cool or heat the air, a blower that moves air to the heat exchanger, and a suction grill through which outside air is suctioned via blowing of the blower. The heat exchanger and the blower are arranged inside the case 10 and the suction grill may be formed at the back of the case 10.

The tray 100 may be configured to be pulled out of the case 10. The retraction of the tray 100 may be implemented as a user grasps a front surface of the tray 100 with the hand to retract the tray 100 from the case 10, or may be implemented in an automated manner through use of buttons or a remote controller of an electronic system. That is, there is no limit as to the method of retracting the tray 100.

Although the front vent grill 150 for air discharge is located at the central portion of the case 10 and the tray 100 is also located at the central portion of the case 10 in the present embodiment, the present invention is not limited thereto, and the front vent grill 150 and the tray 100 may of course be located at other positions of the case 10.

Figure 2:
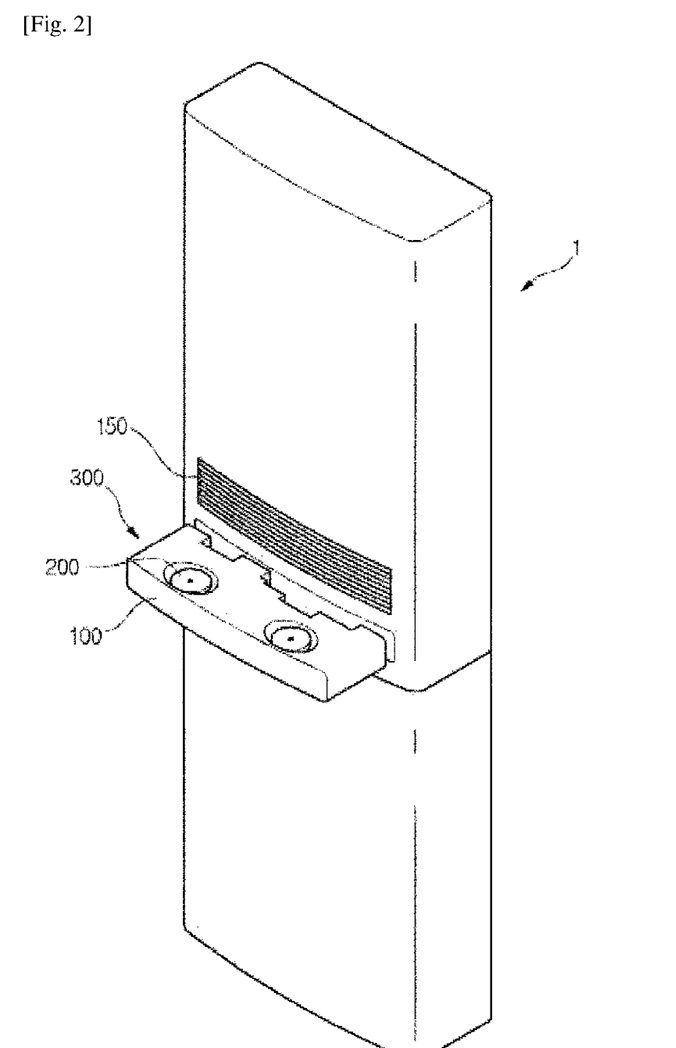
FIG. 2 is a perspective view illustrating a state in which a tray is pulled out from the main body according to an embodiment of the present invention.
Figure 3:
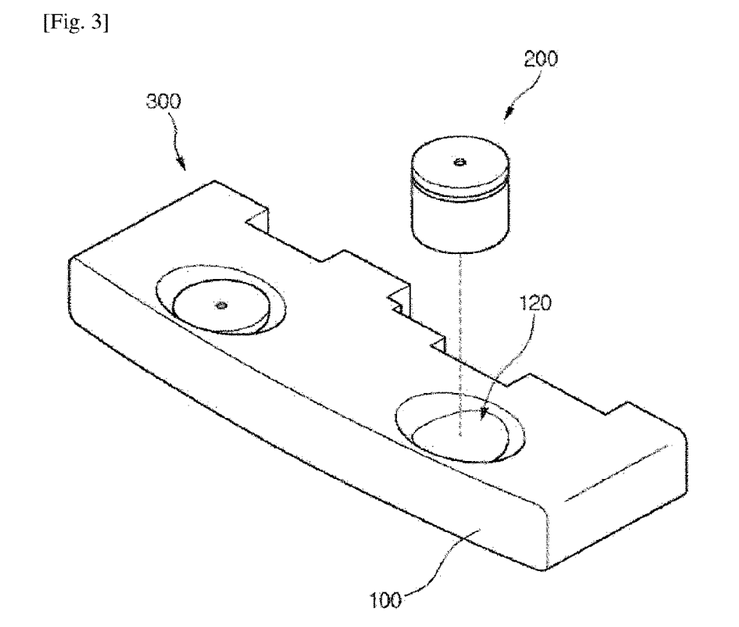
FIG. 3 is a view illustrating a procedure of seating a capsule in a seating recess indented in a mounting structure according to an embodiment of the present invention.
Figure 4:
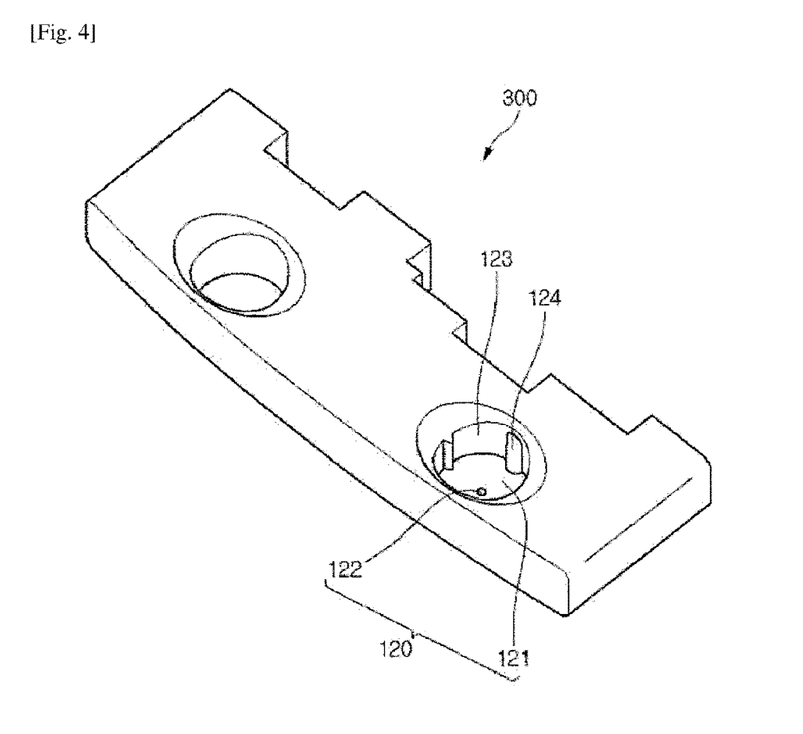
FIG. 4 is a perspective view illustrating the mounting structure according to an embodiment of the present invention.
Figure 5:
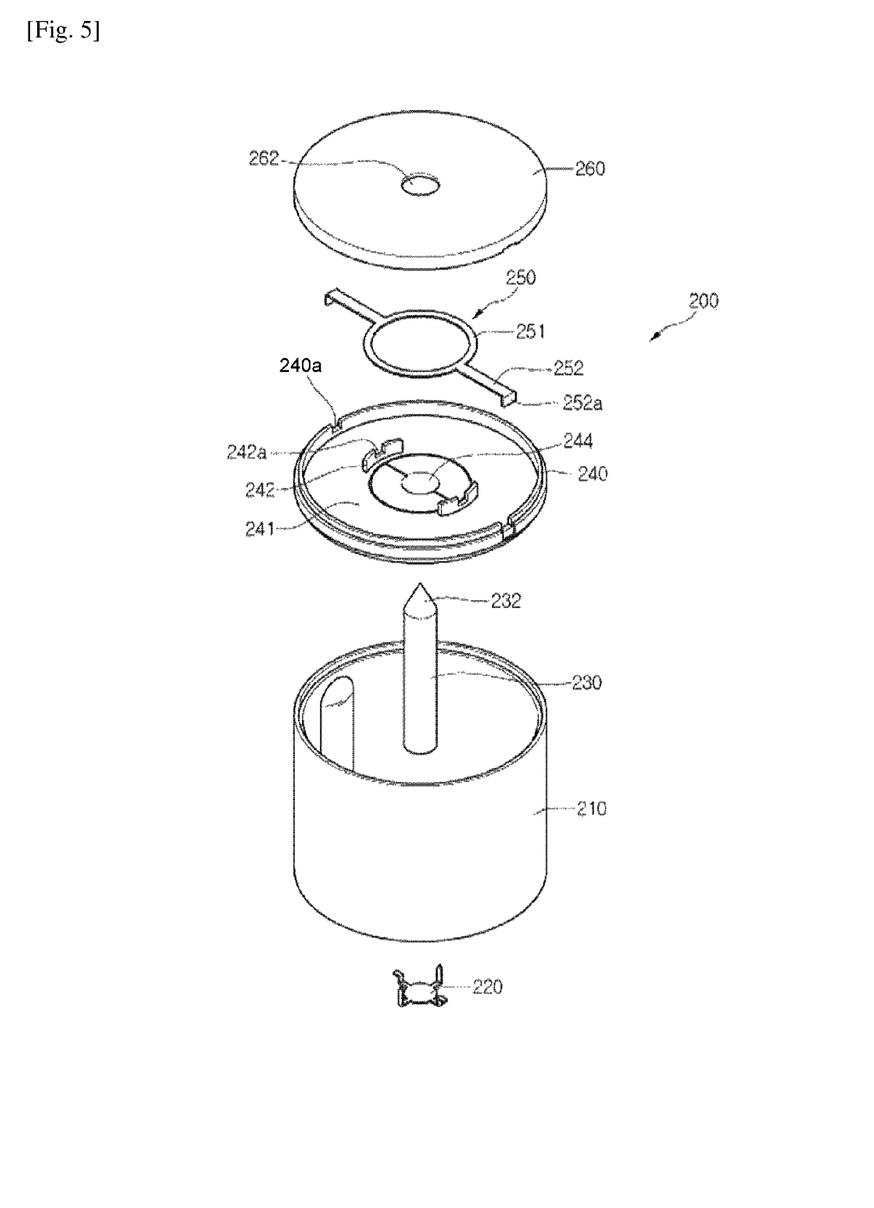
FIG. 5 is an exploded perspective view illustrating the capture according to an embodiment of the present invention.
Figure 6:
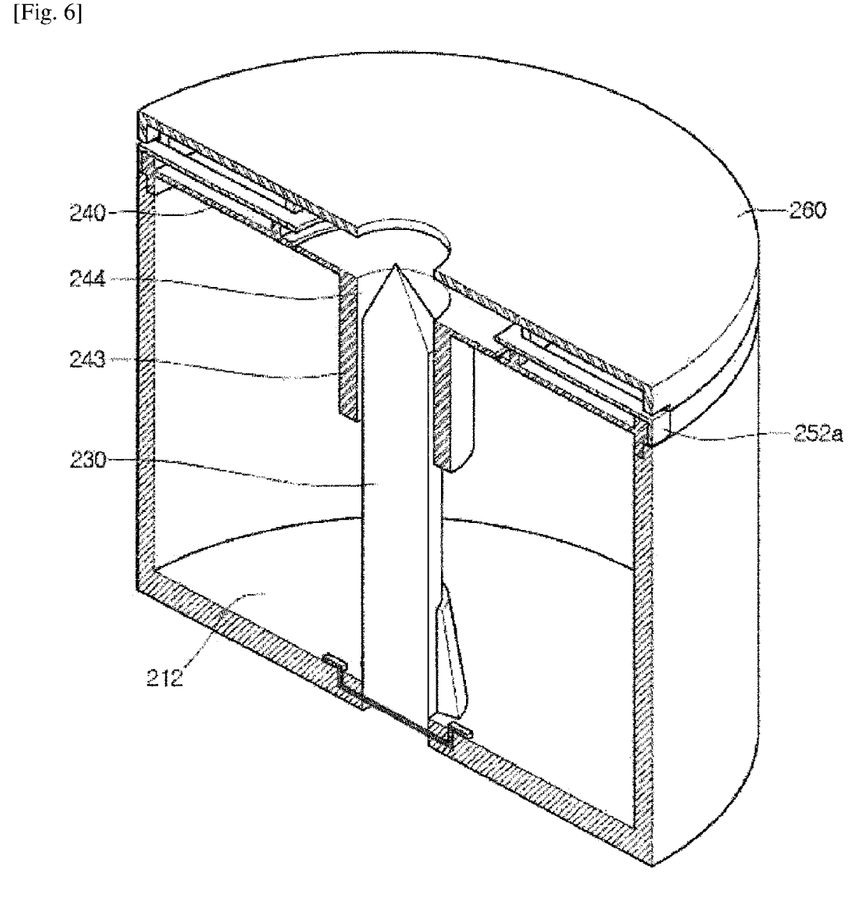
FIG. 6 is a perspective view illustrating the inside of the capture according to an embodiment of the present invention.

FIG. 2 is a perspective view illustrating a state in which the tray is pulled out from the main body according to an embodiment of the present invention, FIG. 3 is a view illustrating a procedure of seating a capsule in a seating recess indented in a mounting structure according to an embodiment of the present invention, FIG. 4 is a perspective view illustrating the mounting structure according to an embodiment of the present invention, FIG. 5 is an exploded perspective view illustrating the capture according to an embodiment of the present invention, and FIG. 6 is a perspective view illustrating the inside of the capture according to an embodiment of the present invention.

Referring to FIGS. 2 to 5, the air conditioner 1 according to the embodiment of the present invention includes a spray device 300 that is capable of discharging a functional material.

The spray device 300 includes a capsule 200 in which the functional material is received and the tray 100 to which the capsule 200 is separably installed. The tray 100 may include a seating recess 120 configured to accommodate the capsule 200 in such a manner that power is applied to the capsule 200.

The seating recess 120 may include an installation plane 121 on which the capsule 200 is placed, a power applying part 122 formed on the installation plane 121 to apply power to the capsule 200, and a ground 124 located at one side of the installation plane 121 to provide the capsule 200 with a ground electrode.

The installation plane 121 may be indented from an upper surface of the tray 100 to support a bottom surface of the capsule 200 placed thereon. The power applying part 122 may be formed on the installation plane 121 so as to come into contact with a power contact piece 220 of the capsule 200.

The ground 124 may be located at an inner circumferential surface 123 of the seating recess 120. The inner circumferential surface 123 may perpendicularly extend downward from the upper surface of the tray 100 to the installation plane 121. The inner circumferential surface 123 may define a depth of the seating recess 120.

The capsule 200 may take the form of a cylinder having a circular bottom surface. As such, the installation plane 121 may have a circular shape corresponding to the shape of the bottom surface of the capsule 200. Note that the shapes of the bottom surface of the capsule 200 and the installation plane 121 are not limited to the above.

The depth of the seating recess 120, i.e. a height of the inner circumferential surface 123 is determined to correspond to a height of the capsule 200. As such, when the capsule 200 is installed in the seating recess 120, a remaining portion of the capsule 200 except for an upper end is embedded in the seating recess 120. At this time, the seating recess 120 may be provided with a groove to assist the user in easily gripping the capsule 200.

There is provided a plurality of seating recesses 120. Correspondingly, a plurality of capsules 200 may be seated in the respective seating recesses 120. As such, the user can mount the capsules 200, in which different kinds of functional materials are received respectively, in the respective seating recesses 120 and can operate a respective one of the capsules 200 according to user preference or purpose. Which one of the capsules 200 mounted in the seating recesses 120 operates may be selected by the user. In one example, the case 10 may be provided with an input unit that may select any one of the seating recesses 120, or any one of the capsules 200.

In response to selection by the input unit, the air conditioner 1 supplies power to the power applying part 122.

The capsule 200 may include a main body 210 having an inner space 212 in which an electrode 230 is accommodated, the power contact piece 220 disposed at a lower surface of the main body 210, and a first cover 260 configured to cover an upper surface of the main body 210.

The power contact piece 220 is disposed at the lower surface of the capsule 200 to receive a voltage. The power contact piece 220 is adapted to come into contact with the power applying part 122 of the seating recess 120, thereby serving to apply a voltage to the inside of the capsule 200.

The power contact piece 220 penetrates the lower surface of the capsule 200 and is electrically connected to the electrode 230 that vertically extends in the inner space 212 of the capsule 200. The main body 210 may be provided at the lower surface thereof with an opening, and the power contact piece 220 may be configured to block the opening.

The electrode 230 may be a carbon electrode having a pointed upper end 232. As such, a voltage is applied to the inner space 212 through the electrode 230. Thereby, the functional material received in the inner space 212 may remain ionized in the capsule 200.

The inner space 212 of the main body 210 receives the functional material.

The first cover 260 is disposed at an upper end of the inner space 212. The first cover 260 is centrally formed with a first hole 262 on the same extension line as the upper end 232 of the electrode 230. Accordingly, the first cover 260 serves not only to cover the functional material and the inner space 212, but also as a passage for discharge of the atomized functional material.

That is, when a voltage is applied to the electrode 230, the functional material received in the inner space 212 is atomized and, in turn, the atomized functional material is directed to pass through the pointed upper end 232 and then discharged from the inner space 212 through the first hole 262.

The first cover 260 may be screwed to an outer circumferential surface of an upper end of the capsule 200.

The functional material may be a scented liquid, or may contain various materials such as, for example, an aromatic liquid that promotes human health, and may additionally include ionized gas. Thus, various capsules may be used in the air conditioner 1 to serve various functions.

A second cover 240 is located below the first cover 260. For convenience of description, the first cover 260 is referred to as an "upper cover" and the second cover 240 is referred to as an "inner cover".

The inner cover 240 includes a cover body 241 having an approximately disc shape and a protrusion 243 located at approximately the center of the cover body 241, the protrusion 243 having a second hole 244 for passage of the electrode 230.

The protrusion 243 may protrude downward from a lower surface of the second cover 240 and have a hollow cylindrical shape. The second hole 244 is formed in the protrusion 243.

As the protrusion 243 protrudes downward from the lower surface of the inner cover 240, a distance between the upper end 232 of the electrode 230 and a location where the atomized functional material is formed increases. As such, the spray amount of the functional material from the capsule 200 may be adjusted to a desired constant value.

In addition, when the capsule 200, which has been exposed to a low temperature inside the air conditioner 1, is exposed to a high temperature upon receiving power through the electrode 230, a pneumatic pressure inside the capsule 200 increases due to variation in temperature. Thereby, there occurs leakage of the functional material through a clearance of the capsule 200. In the present embodiment, this leakage may be prevented by allowing expanded air to be discharged from the inner space 212 through the second hole 244.

The electrode 230 penetrates the protrusion 243 of the inner cover 240 to extend to a position below the first cover 260.

The spray device 300 further includes a ground ring 250 that is coupled to the second cover 240 so as to come into contact with the ground 124.

The ground ring 250 includes a ring body 251 having an approximately annular shape, support bars 252 extending from the ring body 251 in opposite directions, and ground coupling portions 252a formed by bending distal ends of the support bars 252.

The ring body 251 is coupled to an approximately central portion of the second cover 240.

The second cover 240 has support ribs 242 to support the ring body 251. The support ribs 242 are curved by a prescribed curvature so as to support an outer circumferential surface of the ring body 251.

Each support rib 242 has a coupling recess 242a for coupling of a corresponding one of the support bars 252. The coupling recess 242a is indented from an upper end of the support rib 242.

The second cover 240 may include second coupling recesses 240a for coupling with the ground coupling portions 252a. The second coupling recesses 240a are indented from a rim of the second cover 240 and the ground coupling portions 252a are seated respectively in the second coupling recesses 240a.

The first coupling recesses 242a and the second coupling recesses 240a are symmetrically arranged about the second hole 244 of the inner cover 240. As such, the ground ring 250 may be seated in the recesses 242a and 240a of the inner cover 240, thereby continuously remaining in a horizontal state on the inner cover 240.

Accordingly, the ground ring 250 generates a potential difference with the electrode 230 and remains in a horizontal state, thereby ensuring creation of a stable electric field around the electrode 230.

Figure 7:
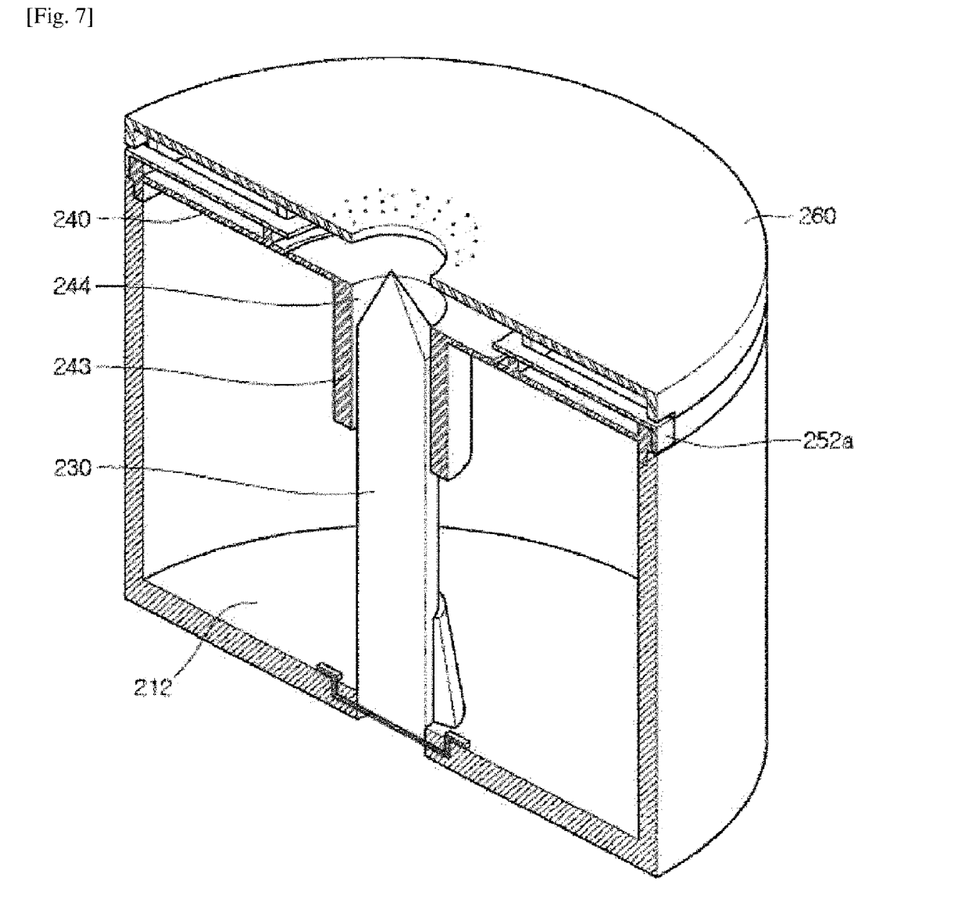
FIG. 7 is a perspective view illustrating an operation of a material spray device according to an embodiment of the present invention.

Hereinafter, an operation of the material spray device 300 will be described.

FIG. 7 is a perspective view illustrating an operation of the material spray device according to an embodiment of the present invention.

Referring to FIG. 7, the user pulls out the tray 100 introduced to the inside of the case 10 using a push or automatic button. Then, the user seats the capsule 200, having the inner space 212 in which the functional material is received, in the seating recess 120. The capsule 200 may be a disposable capsule, or may be rechargeable with the functional material. The functional material may be a combination of air and any one of various kinds of functional materials.

Once the capsule 200 has been seated in the seating recess 120, a controller detects installation of the capsule 200 and the user introduces the tray 100 to the case 10 based on a detected result. Subsequently, the user drives the air conditioner by pushing a power button of the air conditioner.

The operating method of the air conditioner may include a voltage applying step of applying a voltage to the capsule 200 installed to the tray 100 of the air conditioner for a first set time when the air conditioner is turned on and an aroma mode is selected.

When the capsule 200 is mounted, the power applying part 122 comes into contact with the power contact piece 220 to apply a voltage to the electrode 230 through the power contact piece 220. When the voltage is applied to the electrode 230, electrons are emitted from the upper end 232 of the electrode 230, thereby charging a liquid around the upper end 232 of the electrode 230. Then, the charged functional material is atomized in the inner space 212 and, in turn, the atomized functional material is directed to pass through the second hole 244 and the first hole 262 and is discharged from the case 10 through the front vent grill 150 along with an air stream inside the case 10.

Accordingly, pleasant indoor air may be maintained via discharge of the functional material.

The operating method of the air conditioner may include a voltage release step of applying no voltage to the capsule 200 for a second set time after the first set time has passed. In the voltage release step, no voltage is applied to the capsule 200 and power consumption of the air conditioner may be reduced as compared to that of the voltage applying step.

The operating method of the air conditioner may include implementation of a preset number of the voltage applying steps and voltage release steps. In the operating method of the air conditioner, the voltage applying step and the voltage release step may constitute one cycle, and this cycle may be performed a predetermined number of times. The second set time may be longer than the first set time.

Figure 8:
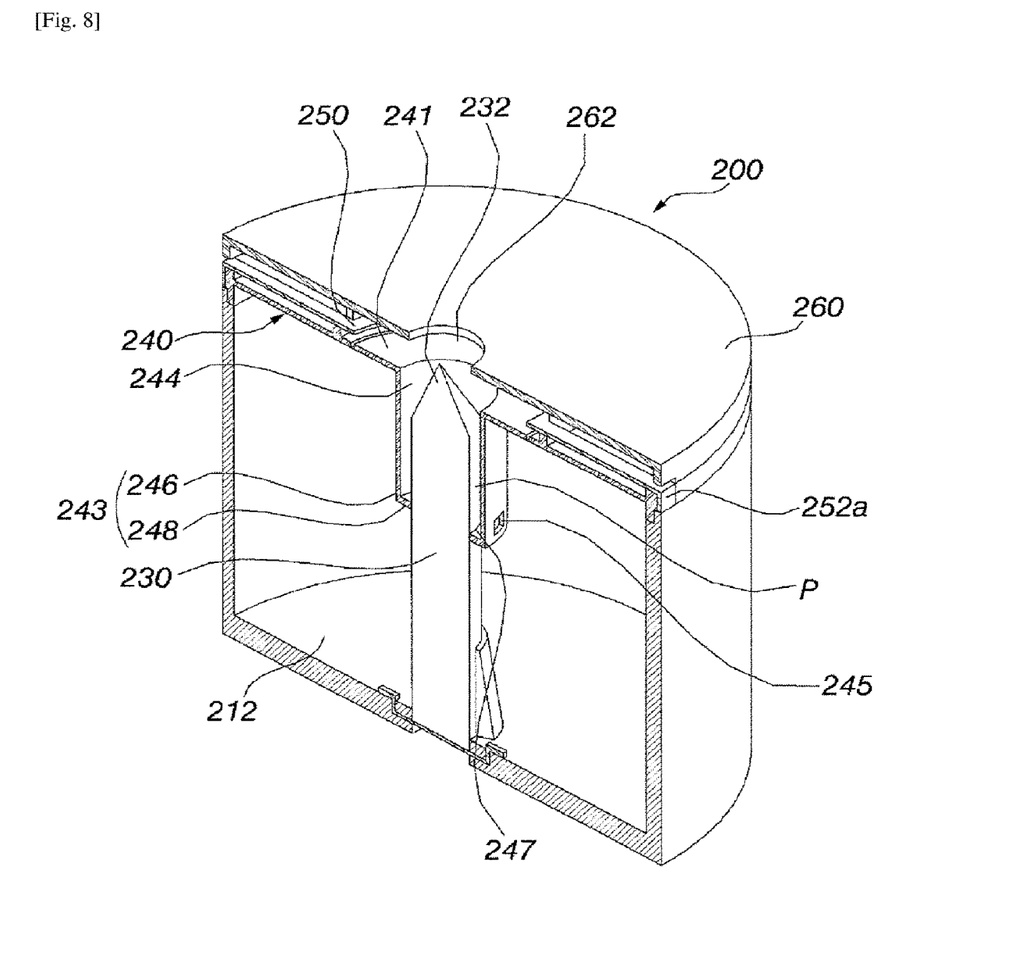
FIG. 8 is a perspective view illustrating the inside of the capsule according to another embodiment of the present invention.

FIG. 8 is a perspective view illustrating the inside of the capsule according to another embodiment of the present invention.

The capsule 200 of the present embodiment may have a third hole 245 formed in the protrusion 243, through which air is introduced into the protrusion 243 and directed to the second hole 244. The protrusion 243 may be comprised of a hollow cylindrical portion 246 surrounding part of the outer periphery of the electrode 230 and a hollow plate portion 248 formed at the hollow cylindrical portion 246, the hollow plate portion 248 having an electrode penetration aperture 247 through which the electrode 230 passes.

The other components and operations thereof according to the present embodiment are equal or similar to those of the above-described embodiment as illustrated in FIGS. 5 to 7 except for the protrusion 243 and the third hole 245 of the capsule 200 and, thus, are designated by the same reference numerals and a detailed description thereof will be omitted hereinafter.

The protrusion 243 may support the electrode 230. The hollow cylindrical portion 246 may not contact the electrode 230 and the hollow plate portion 248 may be in contact with the electrode 230. The electrode 230 may come into contact at part of the outer periphery thereof with the hollow plate portion 248 to thereby be supported by the protrusion 243. The hollow plate portion 248 may come into contact at the inner periphery thereof with the outer periphery of the electrode 230. The protrusion 243, more particularly, the hollow plate portion 248 may serve as an electrode supporter to support the electrode 230. The electrode 230 may be vertically elongated and have a free upper end. With this configuration, the electrode 230 may be maintained at a correct position without a risk of being turned upside down when caught by the protrusion 245, more particularly, the hollow plate portion 248. The hollow plate portion 248 may also serve a position determiner to determine a position of the electrode 230.

The electrode penetration aperture 247 may have a cross sectional area slightly greater than or equal to a cross sectional area of the electrode 230. The electrode penetration aperture 247 may be an electrode support aperture for supporting the electrode 230. The cross sectional area of the electrode penetration aperture 247 may be smaller than a cross sectional area of the second hole 244 and the hollow plate portion 248 may function to prevent the functional material from excessively flowing to the second hole 244.

The capsule 200 may have a receiving space defined between a lower surface of the cover body 241 of the inner cover 240 and an inner surface of the main body 210 for receiving the functional material. The receiving space may receive air as well as the functional material. The inner cover 240 may function as an inner cap that prevents the functional material from moving to the first hole 262 of the first cover 260 during transportation or movement of the capsule 200.

The hollow cylindrical portion 246 may protrude downward from the cover body 241 of the inner cover 240. The hollow cylindrical portion 246 may have a diameter greater than an outer circumference of the electrode 230. An outer circumferential surface of the electrode 230 may be spaced apart from an inner circumferential surface of the hollow cylindrical portion 246, and an air passage P for passage of the air directed to the second hole 244 through the third hole 245 may be formed between the electrode 230 and the hollow cylindrical portion 246.

The hollow plate portion 248 may be horizontally formed below the hollow cylindrical portion 246. The hollow plate portion 248 may block a lower end of the air passage P. Specifically, the hollow plate portion 248 may block a gap between a lower end of the hollow cylindrical portion 246 and the outer circumferential surface of the electrode 230.

The capsule 200 has a clearance between the upper end 232 of the electrode 230 and the top of the hollow cylindrical portion 246. When the clearance is narrow, the functional material may be excessively formed between the upper end 232 of the electrode 230 and the top of the hollow cylindrical portion 246, which may cause an excessively great spray amount of the functional material. The capsule 200 may be configured to minimize formation of the functional material between the top of the hollow cylindrical portion 246 and the upper end 232 of the electrode 230.

In the case where the hollow plate portion 248 located below the hollow cylindrical portion 246 is closer to the electrode 230 than the hollow cylindrical portion 246, as described above, the capsule 200 may minimize formation of the functional material around the upper end 232 of the electrode 230. This may prevent an excessive amount of the functional material from being sprayed from the capsule 200. In this way, the spray amount of the functional material from the capsule 200 may be managed at a constant value.

In addition to the electrode penetration aperture 247, the protrusion 243 may be formed with the third hole 245 through which outside air is introduced into the protrusion 243 to thereby be directed to the second hole 244. The third hole 245 may be not connected to the electrode penetration aperture 247, but spaced apart from the electrode penetration aperture 247. The third hole 245 may be an air passage hole regardless of penetration of the electrode 230. The third hole 245 may be formed in at least one of the hollow cylindrical portion 246 and the hollow plate portion 248. In the case where the third hole 245 is formed in the hollow cylindrical portion 246, the third hole 245 may face the outer circumferential surface of the electrode 230. In the case where the third hole 245 is formed in the hollow plate portion 248, the third hole 245 may be located next to the electrode penetration aperture 247. The third hole 245 may be formed across the hollow cylindrical portion 246 to the hollow plate portion 248. The third hole 245 may be formed proximate to the boundary of the hollow cylindrical portion 246 and the hollow plate portion 248.

The capsule 200 may be located inside the air conditioner that exhibits great variation in temperature during operation of the air conditioner. That is, the capsule 200 may be exposed to a low temperature during operation of the air conditioner and then exposed to a higher temperature upon stop of the air conditioner. This variation in temperature may cause an increase in pneumatic pressure inside the capsule 200 and, consequently, expansion of air. When air of the inner space 212 is not appropriately discharged when the pneumatic pressure increases, the functional material received in the inner space 212 may leak through the clearance of the capsule 200. The air of the inner space 212 may be introduced into the protrusion 243 through the third hole 245 by a pressure difference within the capsule 200. Then, the air introduced into the protrusion 243 may pass through the second hole 244 and the first hole 262 in sequence. Through this air movement, the capsule 200 may be free from an excessive increase in pressure therein and may also minimize leakage of the functional material caused when the pressure inside the capsule 200 excessively increases.

In the above description, though all components constituting the embodiments of the present invention are described as being coupled into one or operated in a coupled state thereof, the present invention should not be limited to these embodiments. That is, one or more of the components may be selectively coupled and operated within the range of the present invention. In addition, in the above description, the terms "include", "constitute", or "have" mean that a corresponding component may be included unless otherwise stated and, therefore, should be construed as further including other components rather than excluding the components. Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

The above description is merely given to describe the technical concept of the present invention by way of example and various modifications and alterations can be made by those skilled in the art to which the present invention pertains within a range not deviating from the essential characteristics of the present invention. Accordingly, the embodiments disclosed in the present invention should not limit the technical scope of the present invention and are intended to explain the technical scope. The scope and spirit of the present invention should be construed by the following claims and all technical ideas within the equivalent range should be construed as within the scope of the present invention.

The invention claimed is:

1. An air conditioner comprising:
   a tray including a seating recess indented from an upper surface thereof; and
   a capsule separably disposed in the seating recess of the tray to discharge a functional material, wherein the capsule includes:
   a main body defining an inner space in which the functional material is accommodated and having an upper opening;
   an electrode disposed in the inner space and atomizing the functional material when a voltage is applied
   a first cover configured to cover the top of the inner space, the first cover having a first hole for discharge of the atomized functional material by the electrode; and
   a second cover having a protrusion for accommodation of at least a portion of the electrode; and a ground ring provided between the first cover and the second cover to generate a potential difference with the electrode, wherein the tray includes a ground configured to come into contact with the ground ring, wherein the ground ring includes:

a ring body having an annular shape, the ring body being coupled to a central portion of the second cover;

a support bar extending from at least one side of the ring body; and a ground coupling portion forming an end of the support bar to come into contact with the ground.

2. The air conditioner according to claim 1, wherein the protrusion extends downward from the second cover and accommodates an upper portion of the electrode.

3. The air conditioner according to claim 1, wherein the protrusion has a second hole formed therein for passage of the electrode.

4. The air conditioner according to claim 3, wherein the protrusion further has a third hole configured to allow air to be introduced to the protrusion and directed to the second hole.

5. The air conditioner according to claim 3, wherein the protrusion includes:

a hollow cylindrical portion configured to surround part of an outer periphery of the electrode; and a hollow plate portion formed at the hollow cylindrical portion, the hollow plate portion having an electrode penetration aperture for passage of the electrode.

6. The air conditioner according to claim 5, wherein the hollow cylindrical portion is spaced apart from the electrode, and wherein the hollow cylindrical portion and the electrode define an air passage therebetween.

7. The air conditioner according to claim 5, wherein the electrode penetration aperture has a smaller cross sectional area than a cross sectional area of the second hole.

8. The air conditioner according to claim 5, wherein the hollow plate portion comes into contact with the electrode.

9. The air conditioner according to claim 5, wherein the protrusion having the electrode penetration aperture further has a third hole configured to allow air to be introduced to the protrusion and directed to the second hole.

10. The air conditioner according to claim 1, wherein the seating recess includes:

an installation plane provided with a power applying part; and an inner circumferential surface extending from an upper surface of the tray to the installation plane.

11. The air conditioner according to claim 10, wherein the ground is located at the inner circumferential surface of the seating recess.

12. The air conditioner according to claim 1, wherein the capsule further includes:

a power contact piece provided on the bottom of the main body to receive a voltage and electrically connected to the electrode.

13. The air conditioner according to claim 12, wherein the ground is disposed on an inner circumferential surface of the seating recess so as to come into contact with the ground ring when the capsule is mounted in the seating recess; and wherein the tray further includes:

a power applying part installed at the bottom of the seating recess so as to come into contact with the power contact piece when the capsule is mounted in the seating recess.

* * * * *